United States Patent
Furman et al.

(10) Patent No.: US 7,294,808 B2
(45) Date of Patent: Nov. 13, 2007

(54) REMOTE WIRE FEEDER

(75) Inventors: Edward M. Furman, Mentor, OH (US); Keith L. Clark, Concord, OH (US)

(73) Assignee: Lincoln Global, Inc., City of Industry, CA (US)

( * ) Notice: Subject to any disclaimer, the term of this patent is extended or adjusted under 35 U.S.C. 154(b) by 295 days.

(21) Appl. No.: 10/800,211

(22) Filed: Mar. 15, 2004

(65) Prior Publication Data

US 2005/0199605 A1    Sep. 15, 2005

(51) Int. Cl.
    *B23K 9/10*    (2006.01)
(52) U.S. Cl. .................................... 219/132
(58) Field of Classification Search ........... 219/132, 219/130.5
    See application file for complete search history.

(56) References Cited

U.S. PATENT DOCUMENTS 4,147,919 A * 4/1979 Matasovic et al. .......... 219/132
6,384,375 B1 * 5/2002 Hongu et al. ............ 219/130.5
2004/0026392 A1 * 2/2004 Feichtinger et al. ..... 219/130.5

* cited by examiner

*Primary Examiner*—Clifford C. Shaw
(74) *Attorney, Agent, or Firm*—Fay Sharpe LLP

(57) ABSTRACT

A wire feeder including a motor driving a set of feed rolls to force a welding wire from a spool through a welding torch to a welding operation. The wire feeder has an input lead to be connected to the output lead of one of a plurality of remotely located power sources, each having a signal receiver for receiving transmitted signal with a code unique to one of the power sources. The receiver having an output for controlling a parameter or condition of the one power source in accordance with a received signal with the unique code. A transmitter on each of said plurality of power sources for transmitting on its output lead a coded signal specific to the power source. A signal receiver on said wire feeder to receive a unique code from the specific power source actually connected to the wire feeder and a circuit on the wire feeder for transmitting command signals from the wire feeder, which command signals each have the unique code specific to the power source connected to said wire feeder.

22 Claims, 7 Drawing Sheets

REMOTE WIRE FEEDER

The present invention relates to the art of electric arc welding and more particularly to a wire feeder with remote control for directing power to the feeder and to the arc.

BACKGROUND OF INVENTION

In many welding applications, a power source is in a fixed location and provides arc power through an electrode cable to a remotely located wire feeder having a spool of welding wire driven by a pair of feed rolls through an elongated tube out a welding torch to the welding operation. Current is directed through the electrode cable to the remotely located wire feeder that is movable from position to position for accommodating welding at different locations. The power on the electrode cable drives the motor that rotates feed rolls for pulling wire from the spool and forcing it through the gun or torch. A trigger on the gun or torch closes a switch to initiate the welding operation and start the drive motor for feeding wire. In accordance with this technology, the electrode cable is provided with power so operation of the trigger closes a mechanical contact within the wire feeder to direct welding current to the torch where it is connected to a contact around the advancing wire. Such remote wire feeders are sold by The Lincoln Electric Company as model No. LN-25 and LN-15. Each of these units has an internal contactor that is closed when the welding operation is to be started. The trigger also causes the motor to drive the feed rolls for advancing the welding wire from the storage spool. This type of remote feeder is beneficial for certain welding, especially in shipyards. However, the internal mechanical contactor in the arc powered feeder is prone to failure caused by arc damage to the contacts due to repeated switching of high inductance DC current. Indeed, the mechanical contactor of the feeder is subject to damage from welding currents which often exceed the contactor's current ratings. It has been found that in some installations, the mechanical contactors do not accommodate repeated use of extremely high welding currents. The wire feeder can not perform short, repetitive welds such as stitch welding or spot welding because of the accumulated heating of the contactor and the mechanical effect of repeated arcing of the contacts in the mechanical contactor. Each time the trigger is pulled, a current surge is created from the electrode cable to the gun. These remote wire feeders have difficulty in changing voltage. The current is controlled by the wire feed speed, however the voltage is separately adjustable. This adjustment must be made at the power source which is often a long distance from the actual welding operation. These units have a single cable between the power source and the wire feeder since coaxial cables and other dual cable designs are extremely expensive. Such deficiencies of existing arc powered wire feeders are overcome by the present invention.

Another problem with existing wire feeders, especially those used in shipyards, involves identification of the actual power source connected to the input power lead of a given wire feeder. A plurality of power sources and a plurality of wire feeders are used in a welding network. The output leads of the many power sources have a connector or "stinger" at the end. The wire feeder receives a stinger; however, it is often impossible to correlate which power source is being connected to a specific wire feeder. The output leads of all of the power sources are directed as a tangle group to the wire feeders. An operator selects one of the stingers from the power sources and connects it to a wire feeder. It is difficult to determine which power source is actually connected to the wire feeder. Indeed, when reconstructing a network in a shipyard all of the power leads from the power sources are merely cut off and gathered as copper bundles for resale. Then new power leads are then connected to the various power sources. There is no indication of which power lead at the wire feeder is corresponding to a given power source. This situation presents a unique problem when implementing the first aspect of the invention wherein the wire feeder communicates a coded command signal to the associated power source. There is no way to determine which code is used by the power source actually connected to a wire feeder. Consequently, transmission of the coded signals from the wire feeder to the associated power source is quite complicated. The connected or associated power source must be identified manually or by following the lead from the wire feeder back to the power source. The present invention solves the problem of identifying the particular power source connected to a specific wire feeder so that the coded communication between the wire feeder and power source using the primary aspect of the invention can be effected in an easy manner.

BRIEF DESCRIPTION OF PRESENT INVENTION

In accordance with the present invention, a welding power source is used with an arc powered wire feeder and overcomes the deficiencies of the prior art discussed above. In accordance with the invention, there is no internal mechanical contactor in the wire feeder. The trigger of the welder is closed. This condition is sensed by the wire feeder and transmitted, either electromagnetically (RF) or through the electrode cable back to the power source. The power source is normally off. Upon receiving a start signal from the remotely located trigger, the power source is energized to direct power through the electrical cable going directly to the welding gun or torch without the intermediate current flow through the contacts of a mechanical contactor at the wire feeder. By using this invention, the welding output is initiated by electronic power devices in the power source itself. These devices or switches are rated for high current, high duty cycles and high power cycling. They are well constructed for competitive switching of high current from the power source to the welding gun. By using the present invention, a voltage select knob or device on the wire feeder itself can be adjusted to set the arc voltage. The set voltage is digitized and transmitted as a signal back to the power source. In this manner, the voltage adjustment of the power source is accomplished by a signal transmitted from the wire feeder back to the power source. A single cable from the power source to the wire feeder is used to transmit welding power to the wire feeder when the weld process is started. To accomplish this objective, a signal is transmitted when the trigger closes the trigger switch to drive the feed rolls and start the weld process. Consequently, the feeder itself is used to adjust the voltage as well as the wire feed speed that controls the current of the welding process. This wire feeder is connected to one of a plurality of power sources. To identify the actual power source connected to the wire feed, the power sources each transmit a unique identification code on its output lead. When this lead is connected to the wire feeder, the wire feeder detects the identification code and sets its transmitter to a code corresponding to the power source code. Thus, the wire feeder commands the actual one of said plurality of power sources to which it is connected. Thus, the power source connected to the wire feeder is shifted to its on condition when the trigger is in the weld position. In accordance with an aspect of the invention, the transmitter is an RF signal generator to create an electromagnetic signal that is coded in a manner that activates only the receiver on the power source connected to the wire feeder. In accordance with another aspect of the invention, the transmitter creates a signal with a unique code transmitted to the specific power source connected to the wire feeder through the input leads to the output terminal of the connected power source. Again, the signal is coded for transmission on the electrical cable itself for receipt only by the connected power source. In accordance with another aspect of the present invention the wire feeder has a voltage select device for manually adjusting to a condition corresponding to the desired arc voltage. A signal representing the set voltage is transmitted as a command signal to the power source connected to the wire feeder for setting the voltage of the connected power source based on the desired voltage set at the remote wire feeder.

In accordance with the present invention, a wire feeder includes a motor driving a set of feed rolls to force a welding wire from a spool through a welding torch to a welding operation. This wire feeder has an input lead connected to the output leads of one of a plurality of remotely located power sources, each of which has a signal receiver for receiving signals with a unique code specific to a given one of the power sources. The receiver on the power source has an output for controlling a parameter or a condition of the power source in accordance with data contained in a signal with a unique code. In accordance with the invention, a transmitter on each of the plurality of power sources is used to transmit on the output lead a coded signal specific to the one power source. A receiver in the wire feeder receives a specific code from only the power source connected to the wire feeder. A circuit in the wire feeder sets the code in the wire feeder transmitter. Thus, the wire feeder transmits command signals to only the power source connected to the wire feeder. These command signals have the unique code specific to the power source connected to the wire feeder.

In accordance with another aspect of the present invention, there is provided a network comprising a wire feeder with an input for welding power from the power lead of one of the plurality of power sources. Each of the power sources has a transmitter to transmit a unique coded signal on its output power lead. A receiver in the wire feeder has a circuit for identifying the actual power source connected to the wire feeder by identifying the unique coded signal received by the wire feeder on its input lead.

In accordance with still another aspect of the present invention, there is provided an electric arc welder power source with an output lead and a transmitter for transmitting a coded identification signal unique to the power source. In a like manner, a wire feeder with an input power lead has a receiver for receiving a coded identification signal unique to a power source connected to its input lead.

The primary object of the present invention is the provision of a remotely located wire feeder driven by one of a plurality of power sources, wherein the wire feeder receives a signal from the particular power source connected to the wire feeder so the wire feeder can automatically identify and communicate with the actual power source connected to the wire feeder.

Still a further object of the present invention is the provision of a wire feeder, as defined above, which wire feeder is used in a network containing a plurality of power sources each of which transmits on its output lead a code unique to the particular power source.

Yet another object of the present invention is the provision of a wire feeder, as defined above, which wire feeder transmits coded information to the identified power source connected to the wire feeder for commanding parameters, such as voltage, and conditions, such as the on condition, from the wire feeder to the power source.

These and other objects and advantages will become apparent from the following description taken together with the associated drawings.

PREFERRED EMBODIMENT

Figure 1:
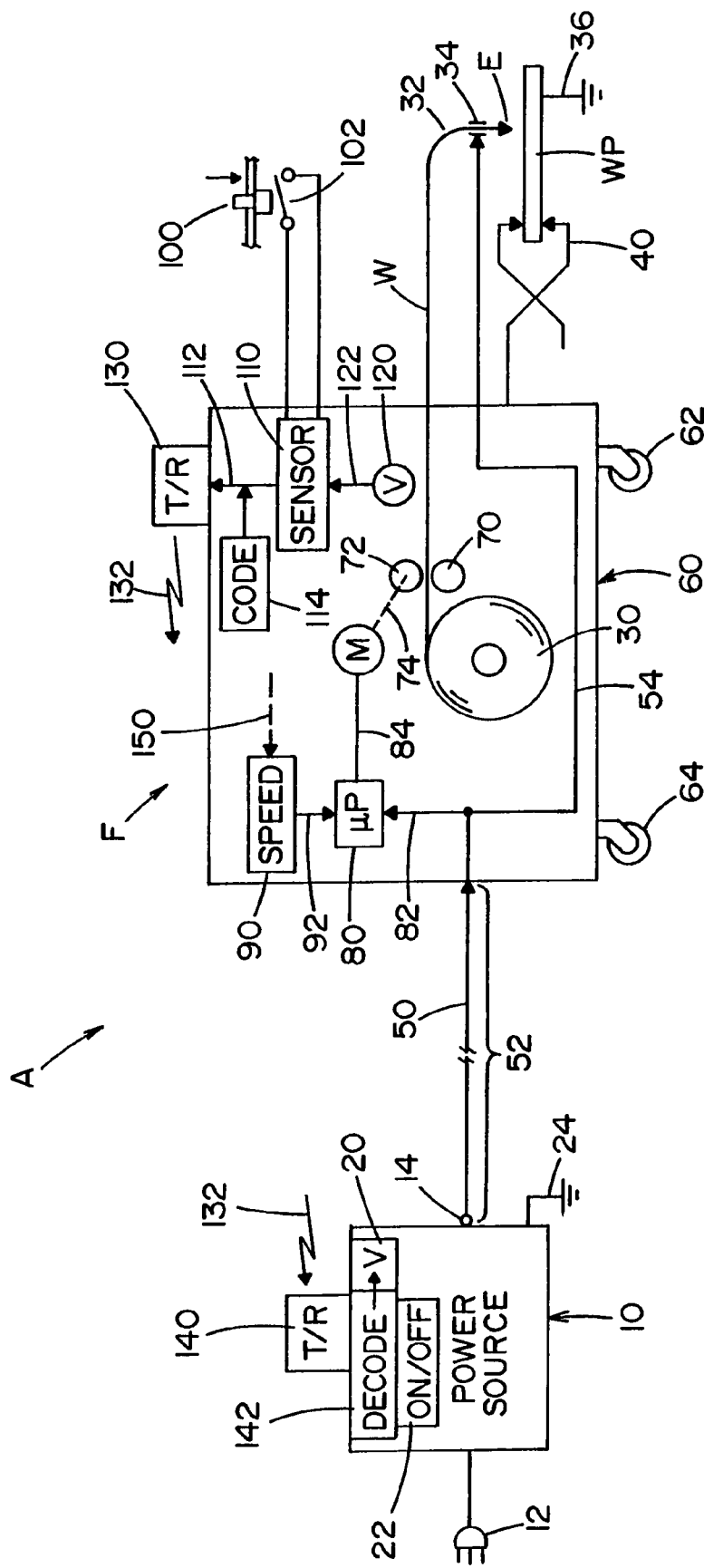
FIG. 1 is a schematic diagram of the wire feeder and power source used in implementing the preferred embodiment of the present invention.

Referring now to the drawings, FIG. 1 shows an electric arc welder A of the type including a generally fixed power source and having input 12 and output terminal or output 14 wherein the arc voltage is controlled by a circuit when the power supply is on at switch 22. In accordance with normal practice, power source 10 has ground 24. This power source is to be controlled by signals from wire feeder F to control the operation of the power source and to remove the need for an internal mechanical connector in the wire feeder. This later feature will be discussed first.

The invention involves a remotely located wire feeder F of the type including an internal spool 30 for electric arc welding wire W. The wire is pulled from spool 30 and pushed through gun or torch 32 to a contact sleeve 34. Electric power is directed to electrode E, which is wire W, for performing an electric arc welding process between the electrode and workpiece WP. Standard ground 36 is connected to the wire feeder through ground clamp 40. Input cable 50 has a length 52 and connects terminal 14 to power lead 54 within feeder F so power is directed to contact sleeve 34 for the welding process when switch 22 of the power supply is closed. In the prior art, a mechanical contact is used in feeder F to direct power from power source 10 to contact sleeve 34. The power supply is on and the welding operation is determined by the closing of the contact in the wire feeder when trigger 100 is closed. Power supply 10 is off until the welding process is to be performed. Remote wire feeder F has cabinet 60 with lower casters 62, 64 so that the wire feeder is easily movable into various locations allowed by the length 52 of cable 50. A welding operation at various locations can be performed effectively. This type of welder is used where the welding operation is not fixed and varies, such as in a shipyard where a plurality of power sources are available for wire feeder F. In FIG. 1, power source 10 is known to be connected to wire feeder F. The aspect of the invention in FIGS. 2-8 makes the association. In some instances, cabinet 60 does not include wheels or casters 62, 64, but is merely pulled along by an appropriate handle from one location to another. In accordance with standard technology, feeder F includes a feed roll 70, 72 driven by motor M through shaft 74. Speed is controlled by microprocessor or other controller 80 that receives power from cable 50 through input 82. Output 84 has a voltage to determine the desired speed of motor M for the proper wire feed speed (WFS) of wire W. The speed is used to control arc current. The feed speed is determined by the speed of motor M and is adjusted manually by speed control 90 having an output 92 for controlling the operation of microprocessor controller 80. Movable trigger 100, associated with gun or torch 32, is depressed to close start switch 102 for starting the welding process between electrode E and workpiece WP. The start condition of switch 102 is sensed by circuit 110 having an output 112 which is digital and coded by an appropriate device 114. Consequently, switch 102 is closed to start a welding process. Sensor 110 creates a coded signal on line 112 indicating that trigger 100 has been closed. In accordance with an aspect of the invention, a voltage knob 120 is set to the desired arc voltage between electrode E and workpiece WP. The position of knob 120 determines the signal on output 122 which is also directed to sensor 110. The output of the voltage control or set knob 120 gives a signal in line 112 which is also modulated by device 114. Thus, a signal in line 112 from sensor 110 indicates when the weld cycle is started by trigger 100 and the desired arc voltage set by knob 120. This coded information is directed to the transceiver 130 that transmits a signal 132, which is an RE electromagnetic signal indicating that the welding process has commenced. In the preferred embodiment signal 132 is a coded signal unique to the power source, so the power source 10 connected to wire feeder F is the one communicated by signal 132. In the embodiment using voltage knob 120, the desired voltage for the welding operation is also transmitted to power source 10. These signals are communicated through the air with receiver 140 on power source 10. The output of the receiver is passed through a decoder 142 for transmitting a set point signal to voltage control 20 and the start signal to switch 22. By merely depressing trigger 100 the welding cycle is started by power source 10. A set voltage is applied to line 54. When trigger 100 is released, switch 102 is opened and a signal on line 112 is transmitted by transceiver 130 to turn off power source 10. In this manner, wire feeder F has no mechanical contactor as used in the prior art when a single cable connects a power source with a wire feeder movable into various remote locations. Thus, the disadvantage of a mechanical contactor in such wire feeder is eliminated.

In accordance with an aspect of the invention, transceiver 130 is used to provide a coded signal unique to receiver 140 of power source 10. This signal is transmitted by cable 50 and not through the air as indicated by signal 132. In still a further aspect of the present invention, receiver 140 is a transceiver and transmits a RF signal to transceiver 130 for the purposes of remotely adjusting the wire feed speed circuit 90, as indicated by the dashed line 150. Other arrangements could be provided for communicating between the remote wire feeder F and its associated power supply 10 to provide the parameters either to or from remotely located wire feeder F.

Figure 2:
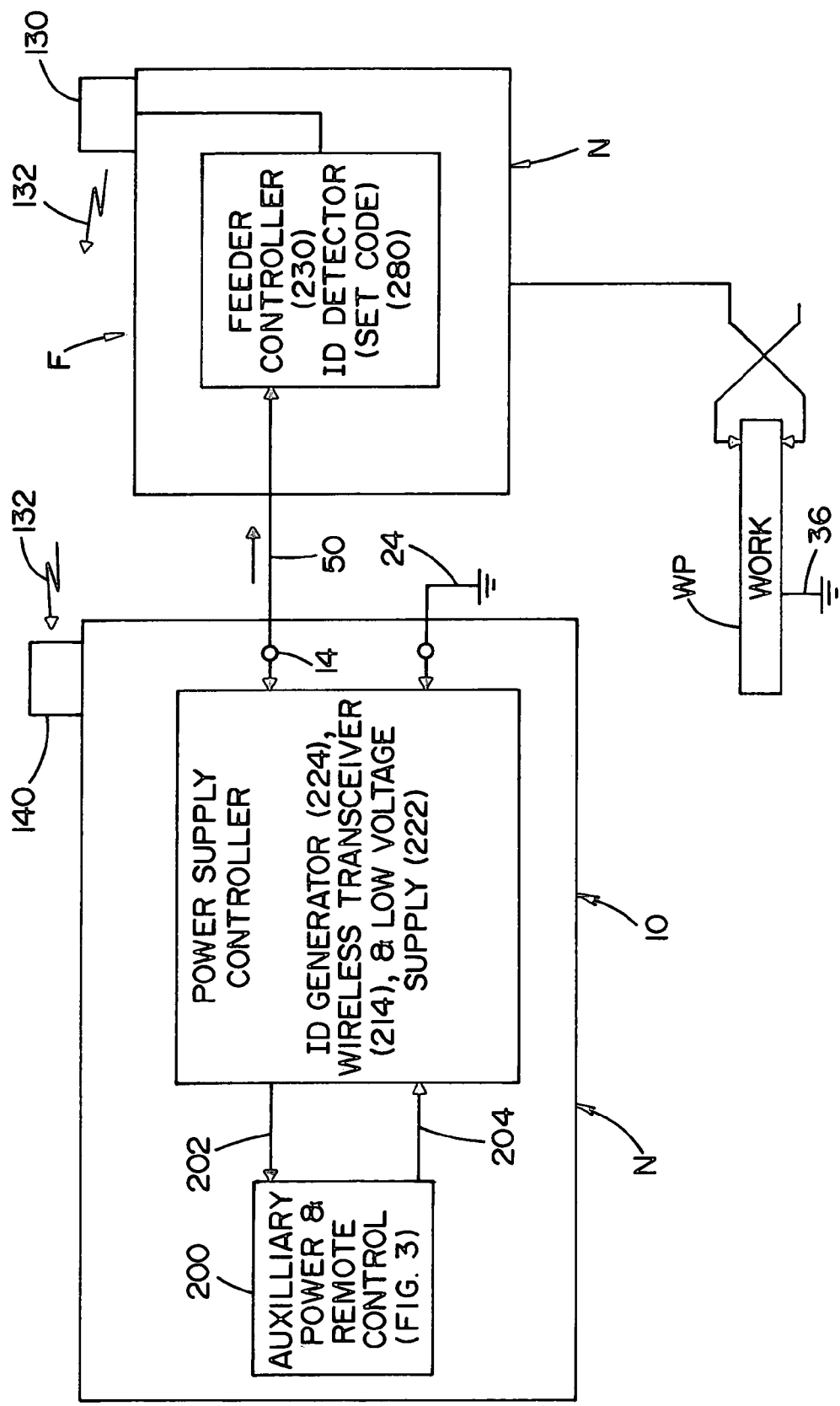
FIG. 2 is a schematic block diagram illustrating the preferred embodiment of the present invention.
Figure 3:
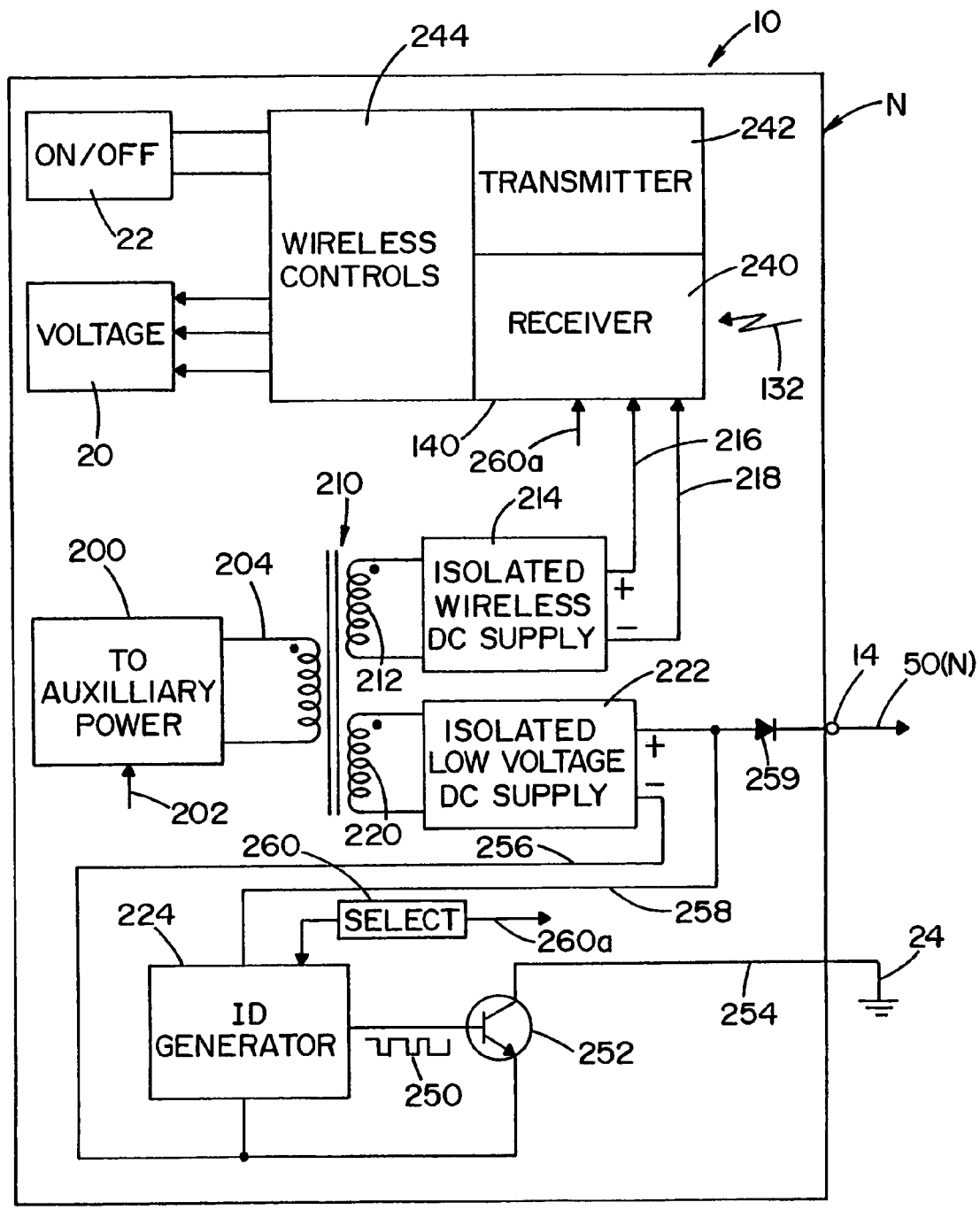
FIG. 3 is a schematic block diagram of the components in a power source constructed in accordance with the present invention.
Figure 4:
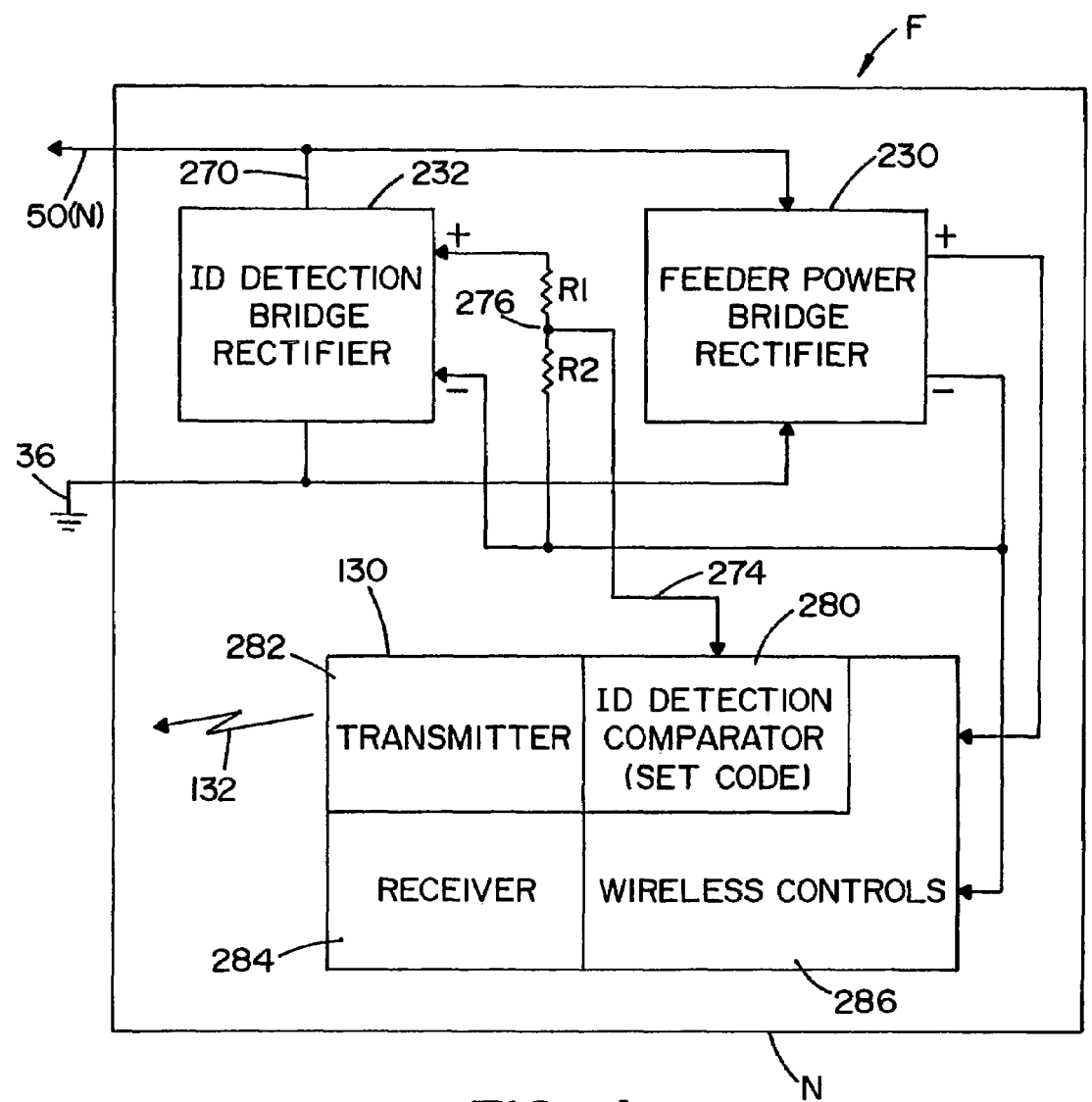
FIG. 4 is a schematic block diagram of the components in a wire feeder constructed in accordance with the preferred embodiment of the present invention.

To assure communication of commands and parameters by signals from wire feeder F to the associated or connected power source 10, it is necessary to determine the particular power source connected to the wire feeder. In a shipyard, many power sources are available and have stingers with long leads extended as a group from a remote location to the location of the wire feeders. It is difficult to determine which lead is associated with which power source; therefore, time and effort must be devoted to identifying the particular power source randomly connected to a given wire feeder. Association of the specific power source with given wire feeder is even more important when using the aspect of the invention when the wire feeder transmits parameters and commands in a coded signal from transmitter 130 to receiver 140 on the power source. The wire feeder must know the particular code that is assigned to the actual power source connected randomly to the wire feeder. This new aspect of the invention is directed to solving this particular problem. The preferred embodiment of this solution is illustrated in FIGS. 2-4. In practice, the power source connected to the wire feeder is not readily known. A mass of comingled power leads from a group of power sources are available for the individual wire feeders. Since the present invention involves communication parameters and conditions from the wire feeder to its power source, it is advantageous to easily determine the particular code of the power source so that the wire feeder can be set to an output code for communication only with the power source connected to the wire feeder. The present invention facilitates this advance whereby the feeder knows which power source is generating its power and has a set communication code matching only with that particular power source. In FIG. 1, the associated or connected power source 10 is known. Thus, the code on transmitter 130 matches the code on receiver 140. By using the present invention, this code matching procedure is done automatically.

In accordance with the invention, as best shown in FIG. 2, power source N is connected to a corresponding wire feeder by power lead 50. Lead 50 is from a commingled group of leads directed to the welding location of feeder F or N. In accordance with the invention, an auxiliary power supply 200 receives control signals in line 202 from the power supply controller of the welder. The output of the auxiliary power source is represented as line 204 in the form of transformer 210.

Transformer 210 has a secondary 212 to create a power supply 214 for transceiver 140 through leads 216, 218. In a like manner, transformer 210 has a secondary 220 for creating a low voltage power supply 222 for driving both the identification signal generator 224 and power supply 222.

As shown in FIG. 3, an isolated low voltage supply is impressed upon the studs of the power source. The low voltage supply provides communication power to the wire feeder. It also is turned on and off by the identification generator forming a serial data stream. The data stream conveys the identification number or code that is unique to the power source controller to the wire feeder connected to the power source. The wire feeder uses a unique identification number or code from the power source controller to encode RF data sent to the wireless controls of the receiver in the power source. The power source controller can also send RF data to the wire feeder once the unique identification of the wire feeder is established.

By using the present invention, a coded signal is transmitted to the wire feeder on power lead 50. This coded signal has a voltage of less than about 15-20 volts. In accordance with the invention, a coded signal unique to power source N is transmitted through line 50 of this power source. This line is connected to wire feeder F which reads the identification code on line 50 and sets feeder F to have an output code so the feeder F corresponds in coded communication language with power source N. In this manner, transmitted signal 132 from transmitter 130 is coded to be accepted only by receiver 140 of a particular power source actually connected to wire feeder F. Consequently, merely by selecting a power lead 50 and connecting the power lead to the end of wire feeder F, the wire feeder is configured to communicate only with the power source N which is the originator of the input lead 50. This is highly advantageous in a shipyard environment where the power leads from the power sources are connected, disconnected and comingled in unidentified patterns.

In FIG. 3, details of the preferred embodiment are illustrated wherein transceiver 140 actually uses receiver 240 to receive uniquely coded signal 132 from the wire feeder connected to the power source. The transmitter stage 242 is used in practice; however, information is generally not transmitted back to the wire feeder, although this could be done on the basis of the same unique code. Transceiver 140 has an output stage or wireless controls 244 that communicate commands to a parameter circuit, such as voltage control circuit 20, or a condition command to control a condition, such as on and off control circuit 22. This has been explained in connection with FIG. 1. The identification code generator 224 creates a low voltage digital signal 250 represented in FIG. 7. An output transistor 252 controls the logic signal on power leads 50(N) by line 258 at the anode of diode 259 and line 256. The emitter of transistor 252 is connected to common ground 24 by line 254. A plurality of pin switches are used as a select device 260 to select the particular or unique code transmitted by generator 224 on power lead 50(N). At the same time device 260 sets the same code in receiver 240 as indicated by line 260a. Thus, by adjusting the selector device, power source 10, identified as source N, is programmed or set to a desired unique code. This code is transmitted to a wire feeder. When lead 50(N) is connected to a wire feeder, the wire feeder identifies the particular power source from which it is receiving its input power. This is used in connection with the system illustrated in FIG. 1. A common unique code exists in both the wire feeder and the connected power source N.

In FIG. 4, wire feeder F receives power from leads 50(N). This drives the power bridge 230 and directs the coded information to identification detector 232. Bridge 232 includes input digital coded information on line 270 and has an output 274 on which the code in the form of a signal is received from the center tap of divider 276. The coded signal in line 274 is directed to the identification detection and comparator 280 to set the code for wire feeder F in accordance with the code received on line 50(N) from the connected power source N. The set code is used in the transmitter section 282 of transceiver 130 to produce coded signal 132 for controlling a parameter and/or a condition of the associated connected power source N. Transceiver 130 also has a receiving stage 284 which is not used in practice, but which could be used for receiving coded information from power source N connected to the wire feeder. By using the circuit shown in FIG. 4 the identification of the power source described in FIG. 2 is implemented in practice.

In FIG. 4, the feeder power bridge rectifier provides power to the feeder and load isolation from digital signals for either electrode polarity. The identification detector bridge rectifier provides proper polarization of the signal for either electrode polarity. Wireless controls 286 transmit output control information to the power source using the radiofrequency (RF) data encoded with the unique identification number or code received from the power source. Once the unique identification number or code is established, the wire feeder can receive encoded radiofrequency data from the power source, as well, although this is not now used in practice.

Figure 5:
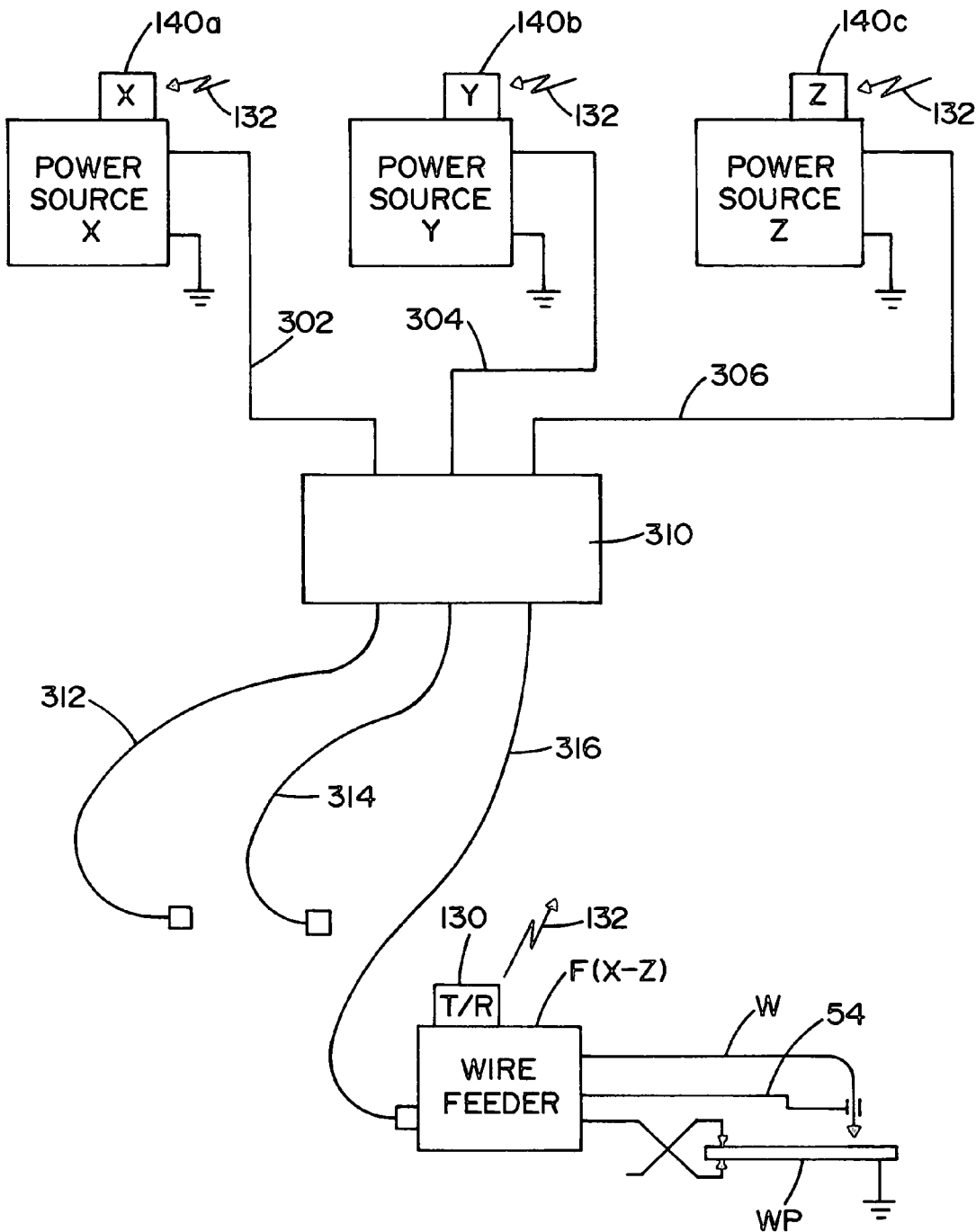
FIG. 5 is a schematic layout illustrating the advantage realized by use of the preferred embodiment of the present invention.
Figure 6:
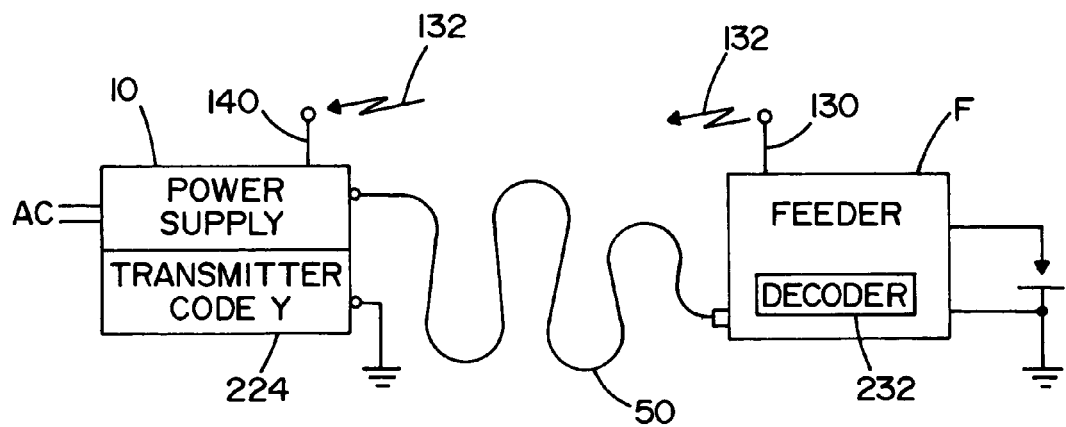
FIG. 6 is a simplified drawing of the overall implementation of the present invention.
Figure 7:
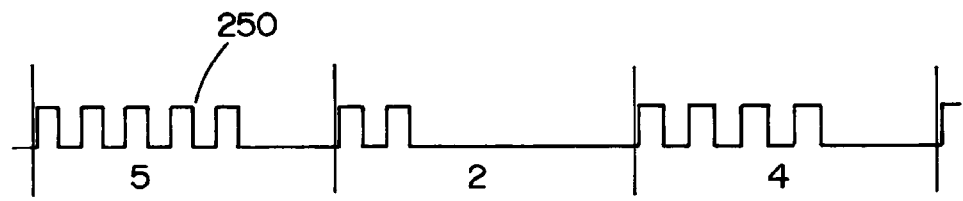
FIG. 7 is a representative type of coded identification signal transmitted from a power source and received by a wire feeder; and, FIG. 8 is a simplified block diagram of the steps in implementing the preferred embodiment of the present invention.
Figure 8:
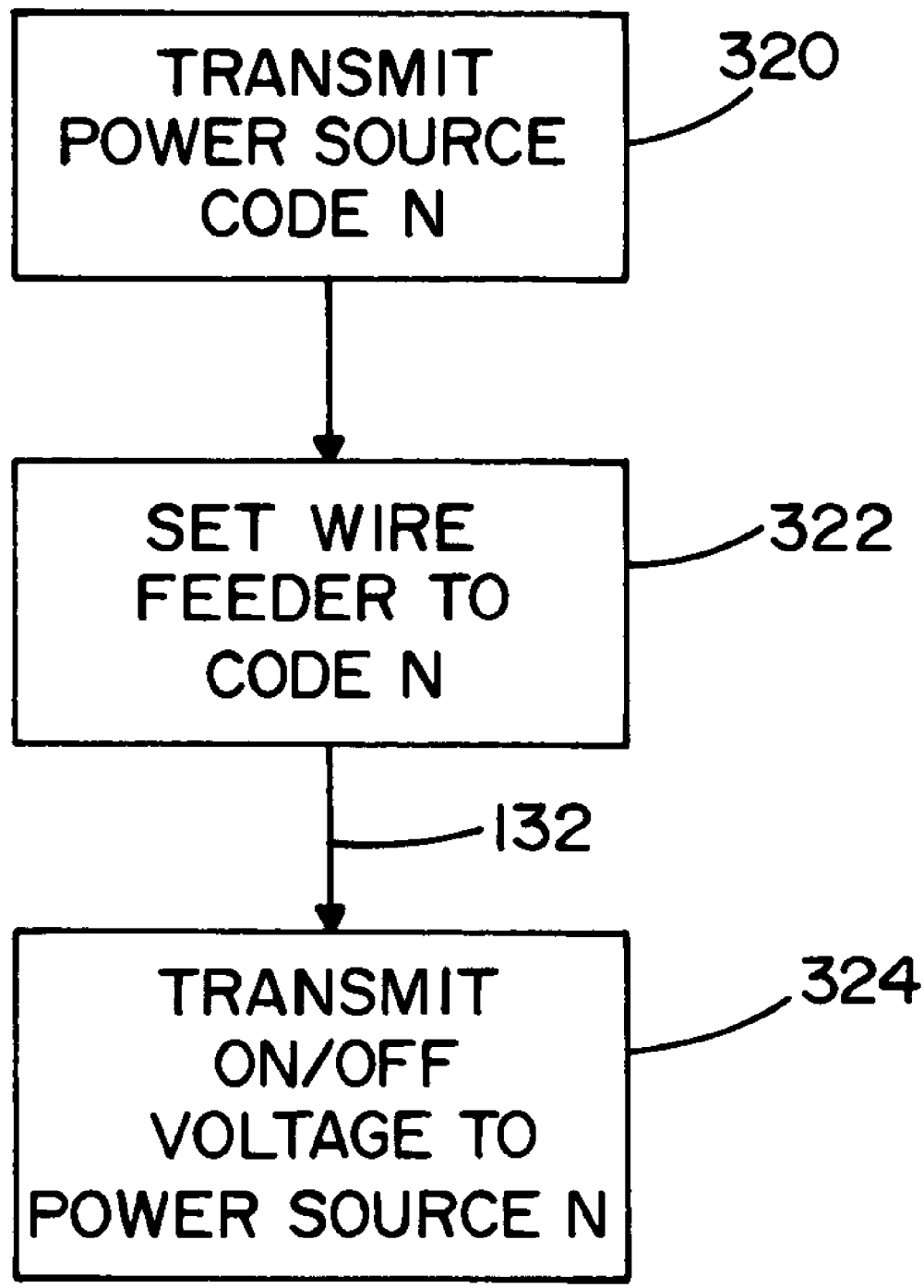

Implementation of the present invention is schematically illustrated in FIG. 5. A plurality of power sources, such as power source X, power source Y, power source Z, have output leads 302, 304 and 306, respectively. Of course, many more power sources are used in a particular welding network. Leads 302, 304 and 306 are commingled as represented by box 310. The leads are grouped as output leads 312, 314 and 316. There is no way to determine which power source lead is connected to one of the stinger leads 312, 314 and 316. The invention solves this dilemma. The lead 316 connected to power source F has a unique coded signal. This coded signal is identified by the wire feeder to set the communication code for transceiver 130. The code of signal 132 is set according to the signal on lead 316. Thus, transmitted signal 132 is set to a code recognized by only the correct transceiver 140a, 140b or 140c and the actual power source in the group of power sources X,Y,Z. This same inventive concept is illustrated differently in FIG. 6. The lead 50 from power source 10 to wire feeder F carries a unique code from transmitter 224. This unique code is received and read by decoder 232 so that the signal 132 between transmitter 130 and receiver 140 is coded to the particular unique code of the power source actually connected to the wire feeder. The unique power source identification code has a variety of implementations. In the illustrated implementation, code 250, shown in FIG. 7, is a serial digital signal transmitted from a power source. This code is illustrated as being the number 5-2-4. When a wire feeder receives the signal 5-2-4 code, it identifies the code and sets its internal transmitter to transmit signals only to the 5-2-4 power source. This process is functionally disclosed in FIG. 8. The steps for producing the present invention start with the box 320. This box indicates that the power source transmits a signal with code N. The code N signal is received by the wire feeder and is employed to set the wire feeder to the corresponding code N (box 322). The information on signal 132 transmitted back to the power source (box 324) has a carrier with the code N so that only the power source N receives the command and/or operation data on signal 132. Consequently, only the power source N is responsive to the information from wire feeder F. By using the present invention, a large number of power sources can be used with a number of wire feeders. By merely connecting a power lead to the wire feeder, the wire feeder is set to communicate only with the power source from which it receives its welding power. This identification procedure greatly enhances the invention illustrated in FIG. 1 wherein the associated wire feeder and power source are connected and communication is by RF or through the power lead so that there is no need for mechanical connectors in the wire feeder itself.

Having thus defined the invention, the following is claimed:

1. A wire feeder including a motor driving a set of feed rolls to force a welding wire from a spool through a welding torch to a welding operation, said wire feeder having an input lead connected to the output lead of one remotely located power source of a plurality of power sources, said one remotely located power source having an on condition and an off condition where a welding current is directed to said output lead only when said source is in said on condition, a receiver on said one remotely located power source to shift said remotely located power source to said on condition upon receipt of a starting signal with a given code that is specific to said one remotely located power source, a weld starting trigger with a weld start position located adjacent said torch to close a switch when said trigger is shifted to the weld position, a circuit to sense when said switch is closed, and a transmitter on said wire feeder to transmit said starting signal with said given code to said one remotely located power source when said trigger switch is closed whereby said one remotely located power source is shifted to its on condition when said trigger is in said weld position, said starting signal and said one remotely located power source have the same given code.

2. A wire feeder as defined in claim 1 wherein said transmitter is an RF signal generator with a signal with a code corresponding to said same identification code.

3. A wire feeder as defined in claim 2 wherein said wire feeder has a voltage select device for manual adjustment to a condition corresponding to a desired arc voltage.

4. A wire feeder as defined in claim 3 including a circuit to convert said condition to a voltage level upon receipt of a signal with said given code and a transmitter on said wire feeder to transmit said voltage level signal with said given code to said power source whereby said power source is set to said desired voltage.

5. A wire feeder as defined in claim 1 wherein said wire feeder has a voltage select device for manual adjustment to a condition corresponding to a desired voltage.

6. A wire feeder as defined in claim 5 including a circuit to convert said condition to a voltage level upon receipt of a signal with said given code and a transmitter on said wire feeder to transmit said voltage level signal with said given code to said power source whereby said power source is set to said desired voltage.

7. A method for turning on one particular power source of an electric arc welder from a plurality of power sources, said one particular power source having a receiver operative only upon receipt of a signal with a specific identification code particular to said one particular power source, a remotely located wire feeder connected to said one particular power source by a power cable, said method comprising:
  (a) starting the welding cycle of a welding process for said welder;
  (b) sensing said starting;
  (c) transmitting a signal with said specific code particular to only said one particular power source of said plurality of power sources from said wire feeder to said one particular power source when said starting is sensed;
  (d) starting said one particular power source upon receipt of said coded signal to direct power to said wire feeder by said cable; and,
  (e) setting the code of said transmitted signal from said wire feeder to said specific code particular to said one particular power source of said plurality power sources.

8. A method as defined in claim 7 wherein said transmitted signal is RF.

9. A method as defined in claim 7 wherein said transmitted signal is by way of said cable.

10. A wire feeder including a motor driving a set of feed rolls to force a welding wire from a spool through a welding torch to a welding operation, said wire feeder having a input lead connected to the output lead of one of a plurality of remotely located power sources each having a signal receiver for receiving a transmitted signal with a code unique to one of said power sources, said receiver having an output for controlling a parameter or condition of said one power source in accordance with a received signal with said unique code, a transmitter on each of said plurality of power sources for transmitting on said output lead a coded signal specific to said power source, a signal receiver on said wire feeder to receive a unique code from the specific power source connected to said wire feeder and a circuit in said wire feeder for transmitting command signals from said wire feeder, which command signals each have the unique code specific to the power source connected to said wire feeder.

11. A wire feeder as defined in claim 10 wherein said power source has an on condition switch activated by a coded command signal received by the receiver of said one power source.

12. A wire feeder as defined in claim 11 wherein said controlled parameter is voltage corresponding to a value on said received coded signal of said one power source.

13. A wire feeder as defined in claim 10 wherein said controlled parameter is voltage corresponding to a value on said received coded signal of said one power source.

14. A network comprising a wire feeder with an input for welding power and a plurality of power sources each having an output lead connectable to said input of said wire feeder, each one of said power sources having a transmitter for transmitting a unique coded signal particular to said one of said power sources on its output lead and a receiver for receiving coded command signals from said wire feeder, said wire feeder having circuit to decode said unique coded signal received from said one of said power sources connected to said wire feeder, said wire feeder having a transmitter for transmitting coded command signals which are coded with said unique coded signal so as to be received by only said one of said plurality of said power sources connected to said wire feeder for operation of said one of said plurality of power sources in accordance with said coded command signals transmitted from said wire feeder.

15. A network as defined in claim 14 wherein each of said command signals transmitted from said wire feeder is a coded on signal with said unique coded signal that is unique to said connected power source.

16. A network as defined in claim 15 wherein said coded on signal is generated by a switch operated in response to closing of the weld trigger of a gun operated by said wire feeder.

17. A network as defined in claim 16 wherein said command signal transmitted from said wire feeder is voltage selected by a knob on said wire feeder.

18. A network as defined in claim 15 wherein said command signal transmitted from said wire feeder is a coded voltage generated by a circuit responsive to a knob on said wire feeder.

19. A network as defined in claim 14 wherein said command signal transmitted from said wire feeder is a coded voltage generated by a circuit responsive to a knob on said wire feeder.

20. A network comprising a wire feeder with an input for welding power from the output power lead of one of a plurality of power sources, each of said power sources having a transmitter to transmit a unique coded signal on its output power lead and a receiver in said wire feeder with a circuit for identifying the actual power source connected to said wire feeder by identifying said unique coded signal received by said wire feeder on its input lead, and each of said power sources has a receiver for receiving a command signal with a code corresponding to a specific power source and said wire feeder has a transmitter set to transmit command signals with a code unique to said power source from which said wire feeder receives power.

21. A wire feeder comprising:
- an input power lead connected to one power source of a plurality of power sources;
- a receiver for receiving a coded identification signal from said one power source on said input power lead, each of said plurality of power sources and said one power source having a transmitter for transmitting an identification signal unique to the transmitting power source, said coded identification signal received by said receiver being unique to said one power source of a plurality of power sources connected to said input lead; and
- a transmitter for transmitting coded command signals from said wire feeder, which coded command signals each include said coded identification signal unique to said one power source connected to said wire feeder so as to be received by only said one power source of said plurality of power sources connected to said wire feeder for operation of said one power source in accordance with said coded command signals transmitted from said wire feeder.

22. A wire feeder as defined in claim 21 further including an output lead connected to said one power source of said plurality of power sources,
  said transmitter transmitting said coded command signals with said coded identification signal unique to only said one power source of said plurality of power sources on said output lead.

* * * * *